Patented July 10, 1945

2,380,325

UNITED STATES PATENT OFFICE 2,380,325

ASYMMETRIC QUATERNARY ESTER-SALTS OF MORPHOLINE

Joseph B. Niederl, Victor Niederl, and Martin McGreal, Brooklyn, N. Y.

No Drawing. Application September 9, 1944, Serial No. 553,466

13 Claims. (Cl. 260—247)

This invention relates to asymmetric quaternary ester-salts of morpholine and to the process by which they are produced.

In our previous applications, Serial Nos. 393,672, filed May 15, 1941; 438,896, filed April 14, 1942; and 471,024, filed January 1, 1943, there are disclosed various quaternary ammonium salts of morpholine including their ester-salts. In the preparation and evaluation of these compounds, it was discovered that, in order to obtain the best balance of chemical, physical, and physiological properties in such quaternary ammonium ester-salts, it is often necessary to produce wholly asymmetric compounds by having each of the three available valences of morpholine satisfied with different substituent groups. N-myristyl-N-benzyl morpholinium ethosulfate affords an excellent illustration of the advisability of having each of the substituents on the morpholinium nitrogen atom different. This compound is a crystalline substance of low toxicity and high germicidal properties, having a phenol coefficient of 500; is completely water soluble and is exceedingly stable even in highly alkaline solutions. It is produced by first forming a N-myristyl-N-benzyl morpholinium halide and then further reacting this intermediate product with a mono-metal salt of monoethyl sulfate, such as silver, potassium or sodium ethyl sulfate. If this process is altered by reacting N-myristyl morpholine in a single step with a simple ester-sulfate, such as diethyl sulfate, to produce N-myristyl-N-ethyl morpholinium ethosulfate, a hygroscopic syrup is obtained which can be crystallized only with the greatest of difficulty. Likewise, if the halide is not removed to form an ester-salt, the intermediate compound is much less soluble in water than the ester-salt and decomposes in weakly alkaline solutions. Furthermore, if the myristyl group is replaced with other alkyl groups, such as a cetyl group, without replacing the other groups, certain bactericidal properties are adversely effected. Thus, in N-myristyl-N-benzyl morpholinium ethosulfate, the benzyl group apparently imparts crystalline properties, the ethosulfate group exceptional stability and solubility, and the myristyl group balanced physiological properties. Collectively, the substituent groups through individual effects and complementary intramolecular interplay impart to the morpholinium compound highly desirable chemical, physical and physiological properties.

Therefore, it is the major object of this invention to produce quaternary ammonium ester-salts of morpholine wherein each substituent group on the morpholine nitrogen atom is different thereby making it possible to procure an intramolecular synchronization not possible when two or more of the substituent groups are the same.

It is a special object to provide new and improved bactericidal agents.

Other objects, features and purposes of the invention will be obvious from the following more detailed description.

The compounds of this invention may be represented by the formula

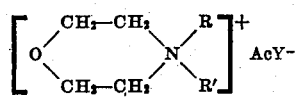

wherein R is an alkyl radical of at least 12 carbon atoms, R' and Y are hydrocarbon radicals of less than 12 carbon atoms differing from one another, and AC is an acid radical. In a special embodiment AC is a SO4 radical but may be any polyvalent acid radical. R may be a lauryl myristyl, cetyl, octadecyl or other alkyl radicals of more than 12 carbon atoms. R' may be a benzyl, phenylethyl cinnamyl or similar aralkyl radical, a methyl, ethyl propyl or like alkyl radical, or a cycloalkyl radical such as a cyclohexyl or similar alkyl, aralkyl or cycloalkyl radical of less than 12 carbon atoms. Y is likewise an alkyl, cycloalkyl or an aralkyl radical of less than 12 carbon atoms but is different from R'. In a special embodiment Y is a low molecular alkyl radical of not more than 8 carbon atoms.

The asymmetric quaternary ammonium ester-salts of this invention are distinguished from the simple ester-salts of morpholine not only in their properties but also in the method by which they are produced. The simple ester-salts of morpholine wherein Y, in the anionic part of the molecule, is identical with one or more or all of the substituent radicals in the cationic part of the molecule are generally produced in a single step by reacting a tertiary morpholine with a di-ester of a polybasic acid such as sulfuric acid. For example, a N-myristyl-N-ethyl morpholinium ethosulfate can be produced by reacting N-myristyl morpholine with diethyl sulfate. However, N-myristyl-N-benzyl morpholinium ethosulfate cannot be produced in an analogous manner for the mixed ester, benzyl ethyl sulfate, is unknown and is difficult if not impossible to produce. Therefore, the compounds of this invention are generally prepared by reacting a tertiary morpholine with an organic halide to form an intermediate quaternary ammonium morpholinium halide and then reacting this compound with a mono-salt of esters of di- or other polybasic acids, such as, sodium, potassium and silver salts of esters of sulfuric, malonic, succinic, phthalic, carbonic, phosphoric and similar acids. Typical compounds produced according to this procedure are the phosphates having the formula

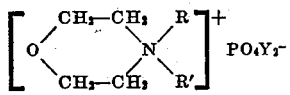

the sulfates having the formula

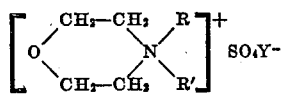

the carbonates having the formula

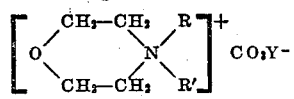

and the like, wherein the substituent groups have the significance hereinbefore stated.

EXAMPLE I

One-tenth mol of potassium ethyl sulfate which has been dissolved in 100 ml. of hot ethyl alcohol is added to 0.1 mol of N-benzyl-N-myristyl morpholinium chloride, prepared as described in U. S. patent application Serial No. 471,024, dissolved in 50 ml. of ethyl alcohol. The reactants are refluxed for 4 hours, and after cooling the reaction mixture to room temperature, it is filtered and then evaporated to dryness. The dry residue is dissolved in hot ethyl acetate, filtered to remove any remaining inorganic matter, and allowed to crystallize. The crystalline N-benzyl-N-myristyl morpholinium ethosulfate thus obtained is recrystallized from ethyl acetate and then has a melting point of 94 to 96° C. The product is soluble in cold water in all proportions, is very soluble in ethyl and methyl alcohol and hot ethyl acetate, it is slightly soluble in benzene and toluene and petroleum ether, and insoluble in ether.

In a like manner the phthalate may be prepared by reacting N-benzyl-N-myristyl morpholinium chloride with potassium ethyl phthalate or the phosphate may be prepared by reacting potassium diethyl phosphate with the N-benzyl-N-myristyl morpholinium chloride.

*Alternative procedure*

(a) One-tenth mol of N-benzyl-N-myristyl morpholinium bromide, prepared as described in U. S. patent application Serial No. 471,024, is dissolved in 50 ml. of ethyl alcohol and to this solution is added 0.1 mol of potassium ethyl sulfate dissolved in 100 ml. of distilled water. This reaction mixture is refluxed for 8 hours and then evaporated to dryness on a steam bath. The dry and solid material is triturated with 100 ml. of cold ethyl alcohol, filtered and again evaporated to dryness. Then the product is dissolved in hot ethyl acetate, filtered to remove the last traces of inorganic material, and allowed to crystallize. The crystalline N-benzyl-N-myristyl morpholinium ethosulfate is once more recrystallized from ethyl acetate and then melts at 94 to 96° C.

EXAMPLE II

One-tenth mol of potassium ethyl sulfate which has been dissolved in 100 ml. of hot ethyl alcohol is added to 0.1 mol of N-benzyl-N-lauryl morpholinium chloride, prepared as described in U. S. patent application Serial No. 471,024, dissolved in 50 ml. of ethyl alcohol. The reactants are refluxed for 4 hours, and after cooling the reaction mixture to room temperature it is filtered and then evaporated to dryness. The dry residue is dissolved in hot ethyl acetate, filtered to remove any remaining inorganic matter and allowed to crystallize. The crystalline N-benzyl-N-lauryl morpholinium ethosulfate thus obtained is recrystallized from ethyl acetate and thus has a melting point of 89 to 90° C. The product is soluble in water, ethyl and methyl alcohol and hot ethyl acetate. It is slightly soluble in benzene and toluene and petroleum ether, and insoluble in ether.

EXAMPLE III

One-tenth mol of potassium ethyl sulfate dissolved in 100 ml. of hot ethyl alcohol is added to 0.1 mol of N-benzyl-N-cetyl morpholinium bromide, prepared as described in U. S. patent application Serial No. 471,024, dissolved in 50 ml. of ethyl alcohol. This reaction mixture is refluxed for 4 hours, allowed to cool and then filtered. The filtered alcoholic solution is evaporated to dryness; the residue is dissolved in hot ethyl acetate and again filtered to remove the last traces of inorganic matter, and allowed to crystallize. The crystalline N-benzyl-N-cetyl morpholinium ethosulfate is again recrystallized from ethyl acetate, and thus purified, has a melting point of 115 to 116° C. The compound is soluble in water, and very soluble in ethyl and methyl alcohol and hot ethyl acetate; it is very slightly soluble in benzene toluene and petroleum ether, and insoluble in ether.

In the same manner, N-benzyl-N-octadecyl morpholinium ethosulfate which is crystalline and melts at 120 to 130° C. may be prepared. It is fairly soluble in cold water, soluble in all proportions in hot water, very soluble in ethyl and methyl alcohol and hot ethyl acetate; it is very slightly soluble in petroleum ether benzene, and toluene, and insoluble in ether.

EXAMPLE IV

One-tenth mol of N-benzyl-N-cetyl morpholinium chloride, prepared as described in U. S. patent application Serial No. 471,024, Example I, is dissolved in 250 ml. of ethyl alcohol. One-tenth mol of potassium methyl sulfate is added, and the reaction mixture is refluxed for 16 hours. The solution is permitted to cool, is filtered to remove the organic material, and then evaporated to dryness. The residual dry mass is dissolved in hot ethyl acetate, again filtered to remove the last traces of inorganic matter, and left standing to allow the product to crystallize. The crystalline material thus obtained is N-benzyl-N-cetyl morpholinium methosulfate, and is recrystallized from ethyl acetate. It has a melting point of 101 to 103° C. This compound is fairly soluble in cold water, completely soluble in hot water, and very soluble in ethyl and methyl alcohol and hot ethyl acetate; it is sparingly soluble in petroleum ether, practically insoluble in benzene and toluene and insoluble in ether.

By following the above procedure and using other N-benzyl-N-alkyl morpholinium chlorides or bromides, such as, N-benzyl-N-lauryl morpholinium chloride or bromide, N-benzyl-N-myristyl morpholinium chloride or bromide, N-benzyl-N-octadecyl morpholinium chloride or bromide. (Prepared as described in U. S. patent application Serial No. 471,024.) The respective N-benzyl-N-alkyl morpholinium methosulfates, such as, N-benzyl-N-lauryl morpholinium methosulfate, which has a melting point of 85 to 87° C., N-benzyl-N-myristyl morpholinium methosulfate, which has a melting point of 90 to 92° C., N-benzyl-N-octadecyl morpholinium methosulfate, which has a melting point of 112 to 113° C., are obtained.

Similarly, N-ethyl-N-alkyl morpholinium bromides, N-ethyl-N-lauryl morpholinium bromide, N-ethyl-N-myristyl morpholinium bromide, N-ethyl-N-cetyl morpholinium bromide, and N-ethyl-N-octadecyl morpholinium bromide, prepared as described in U. S. patent application Serial No. 393,672, and in Journal American Chemical Society, vol. 63, page 1476, are converted into the respective ethosulfates by following Examples 1 to 4, and into the respective methosulfates by following Example 5.

EXAMPLE V

One-tenth of a mol of N-methyl-N-cetyl morpholinium iodide, prepared as described in U. S. patent application Serial No. 435,638, Example I, is completely dissolved in hot ethyl alcohol. To this solution, contained in a suitable reflux apparatus, is added, in small portions, 100 ml. of a hot ethyl alcohol solution containing 0.1 mol of potassium ethyl sulfate. The mixture is refluxed several hours and then the alcohol is distilled off. The residue is triturated with hot ethyl acetate and filtered. The final reaction product, the N-methyl-N-cetyl morpholinium ethosulfate, separates out on cooling. This compound has a melting point of 110 to 116° C. It is soluble in water, very soluble in ethyl and methyl alcohol, and hot ethyl acetate; it is very slightly soluble in benzene, toluene, and petroleum ether, and insoluble in ether.

In a similar manner the N-methyl-N-lauryl morpholinium iodide, N-methyl-N-myristyl morpholinium iodide, and N-methyl-N-octadecyl morpholinium iodide, prepared as described in U. S. patent application Serial No. 435,638, are converted into the respective ethosulfates.

By following the above procedures and examples, asymmetric piperidinium ester-salts are prepared just as easily and efficiently. Thus N-lauryl-N-myristyl-N-cetyl, or the N-octadecyl-N-benzyl-piperidinium halides can be converted into the respective N-lauryl-N-myristyl-N-cetyl or N-octadecyl-N-benzyl-piperidinium metho- or ethosulfates with synchronized intramolecular characteristics and properties.

In a similar manner, we obtain asymmetric quaternary ammonium ester-salts of such N-deterocyclics in which three valences of the nitrogen atom are already utilized within the ring, as in pyridine, quinoline, iso-quinoline, nicotine and the like. Thus, for examples, by utilizing any of the above procedures the N-lauryl-N-myristyl-N-cetyl or N-octadecyl pyridinium, quinolinium, iso-quinolinium or nicotinium halides may be converted into the respective metho- or ethosulfates.

Furthermore, the present invention is not limited to the production of wholly asymmetric quaternary ammonium ester-salts only, but can be advantageously used to produce mixed, but not wholly asymmetrical quaternary ammonium ester-salts, to affect partial intramolecular synchronization of desirable properties. Thus by again following procedures selected from the foregoing five examples, any quaternary ammonium halide may be converted into the respective quaternary ammonium ester-salts. For example, by treating any of the high molecular quaternary ammonium halides, such as the N-lauryl-N-myristyl-N-cetyl or N-octadecyl-N-aryl-N,N-di-alkyl ammonium halides with sodium, potassium or silver methyl or ethyl sulfate, the respective metho- or ethosulfates are obtained possessing partially enhanced physical, chemical, or physiological properties.

In instances where it is merely desirable to solubilize the halides, it is not necessary to actually isolate the final reaction product nor to use equimolar quantities of the alkali salts of the sulfuric acid mono-esters. Thus, solutions of the halide may be refluxed with such submolar quantities of sulfate as to produce concentrated homogeneous aqueous solutions of mixtures of halide and sulfate, for use in commercial antiseptic, bactericidal, or fungicidal preparations, without actually isolating any of the individual components of the reaction mixture.

It will be understood that the embodiments of the invention described in the specification and illustrated by the examples are only illustrative of the compounds and the processes by which they are produced. Various modifications can be made without departing from the principles of the invention.

We claim:

1. A process for producing asymmetric ester-salts of morpholine which comprises reacting a quaternary ammonium morpholinium halide with a mono-metal salt of an ester of a polybasic acid.

2. A process for producing a capillary-active water-soluble and bactericidal composition which comprises reacting a quaternary ammonium halide of morpholine containing an alkyl radical of at least 12 carbon atoms substituted on the nitrogen atom with a mono-metal salt of an alkyl ester of sulfuric acid.

3. A process for producing asymmetric quaternary ammonium ester-salts of morpholine which comprises reacting morpholine substituted on its nitrogen atom with a high molecular hydrocarbon group with an aralkyl halide to form a quaternary ammonium halide of morpholine substituted on its nitrogen atom by said alkyl and aralkyl radicals, and then reacting said halide with a mono-metal salt of an alkyl ester of a polybasic acid to form an asymmetrical quaternary ammonium ester-salt of morpholine.

4. A process for producing N-benzyl-N-myristyl morpholinium ethosulfate which comprises reacting an N-benzyl-N-myristyl morpholinium halide with potassium ethyl sulfate.

5. A process for producing water-soluble and capillary-active bactericidal compositions which comprises reacting a quaternary ammonium morpholinium halide substituted by an alkyl radical of at least 12 carbon atoms and a hydrocarbon radical of less than 12 carbon atoms with a mono-metal salt of ethyl sulfate to form an asymmetric ester-salt or morpholine.

6. A process for producing a water-soluble and capillary-active bactericidal composition, which comprises reacting a quaternary ammonium halide of morpholine substituted on its nitrogen atom only by hydrocarbon radicals, of which one is an alkyl radical of at least 12 carbon atoms and the other is a hydrocarbon radical of less than 12 carbon atoms, with a mono-metal salt of an alkyl ester of a polybasic acid, the ester forming radical containing less than 12 carbon atoms and being different from any of the substituents on the nitrogen atom.

7. A process for producing asymmetric ester-salts of morpholine which comprises reacting a hydrocarbon substituted morpholine with a halogen substituted hydrocarbon to form a hydrocarbon substituted quaternary morpholinium halide and reacting this intermediate product with a mono-metal salt of a polybasic acid ester to form the asymmetric ester-salts.

8. Water-soluble capillary-active compounds having the general formula

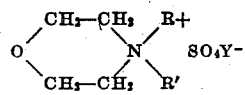

in which R is an alkyl radical of at least 12 carbon atoms, R' is a hydrocarbon radical of less than 12 carbon atoms, and Y is an alkyl radical of less than 12 carbon atoms differing from R'.

9. A water-soluble capillary-active bactericidal compound, an N-alkyl-N-benzyl morpholinium alkyl sulfate, wherein the alkyl radical substituted on the nitrogen atom contains 12 to 18 carbon atoms and the alkyl radical substituted on the sulfate group contains less than 12 carbon atoms.

10. A water-soluble capillary-active bactericidal compound, a N-dialkyl morpholinium alkyl sulfate wherein each alkyl radical is different, one alkyl radical substituted on the nitrogen atom containing more than 12 carbon atoms and the remaining two alkyl radicals containing less than 12 carbon atoms.

11. A water-soluble capillary-active bactericidal compound, N-benzyl-N-myristyl morpholinium ethosulfate.

12. A water-soluble capillary-active bactericidal compound, N-benzyl-N-myristyl morpholinium methosulfate.

13. A water-soluble capillary-active bactericidal compound, N-benzyl-N-myristyl morpholinium ethosulfate.

JOSEPH B. NIEDERL.
VICTOR NIEDERL.
MARTIN McGREAL.